United States Patent
Faruque et al.

(10) Patent No.: US 12,479,385 B2
(45) Date of Patent: Nov. 25, 2025

(54) ELECTRONICALLY CONTROLLED AIRBAG VENTS

(71) Applicant: Ford Global Technologies, LLC, Dearborn, MI (US)

(72) Inventors: Mohammad Omar Faruque, Ann Arbor, MI (US); S.M. Iskander Farooq, Novi, MI (US); Dean M. Jaradi, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 47 days.

(21) Appl. No.: 18/425,269

(22) Filed: Jan. 29, 2024

(65) Prior Publication Data

US 2025/0242773 A1 Jul. 31, 2025

(51) Int. Cl.
*B60R 21/017* (2006.01)
*B60R 21/239* (2006.01)

(52) U.S. Cl.
CPC .......... *B60R 21/017* (2013.01); *B60R 21/239* (2013.01)

(58) Field of Classification Search
CPC ............................ B60R 21/017; B60R 21/239
See application file for complete search history.

(56) References Cited

U.S. PATENT DOCUMENTS

| | | | | |
|---|---|---|---|---|
| 5,478,111 A * | 12/1995 | Marchant | .............. | B60R 21/239 280/739 |
| 5,853,192 A * | 12/1998 | Sikorski | ................ | B60R 21/276 280/739 |
| 6,705,642 B1 * | 3/2004 | Serban | .............. | B60R 21/01528 280/739 |
| 6,752,420 B2 | 6/2004 | Ziolo et al. | | |
| 6,971,671 B2 * | 12/2005 | Schneider | .............. | B60R 21/276 280/739 |
| 7,334,814 B2 * | 2/2008 | Fischer | ................. | B60R 21/276 280/739 |
| 9,016,721 B1 * | 4/2015 | Potter | .................. | B60R 21/231 280/739 |
| 9,550,465 B1 * | 1/2017 | El-Jawahri | .......... | B60R 21/0134 |
| 9,566,936 B2 | 2/2017 | Biller et al. | | |
| 2003/0075223 A1 | 4/2003 | Breed et al. | | |
| 2005/0236822 A1 * | 10/2005 | Rose | ..................... | B60R 21/239 280/739 |

FOREIGN PATENT DOCUMENTS

| | | | | |
|---|---|---|---|---|
| DE | 102012001180 A1 | 7/2013 | | |
| DE | 102013213895 A1 * | 1/2015 | .......... | B60R 21/239 |
| KR | 20030009798 A | 2/2003 | | |

OTHER PUBLICATIONS

Amend, J. M., "GM Adds 'Smart Airbag' to '13 Chevy Cruze," Wards Auto, Dec. 18, 2012, 4 pages.

* cited by examiner

*Primary Examiner* — Kurt Philip Liethen
(74) *Attorney, Agent, or Firm* — Frank A. MacKenzie; Brooks Kushman P.C.

(57) ABSTRACT

An airbag system including a panel defining a chamber. A vent opening extends through the panel and a cover is positioned over the vent opening and attached to the panel. A conductor at least partially surrounds the vent opening and is operative to release at least a portion of the cover from the panel when the conductor is electrically energized.

14 Claims, 6 Drawing Sheets

ELECTRONICALLY CONTROLLED AIRBAG VENTS

BACKGROUND

Vehicles are equipped with airbag assemblies that include an airbag and an inflator. In the event of certain vehicle impacts, the inflator activates and provides inflation medium to the airbag. This pressurizes the airbag to control the kinematics of an occupant during certain vehicle impacts. The airbag assemblies may be located at various positions in the passenger compartment of the vehicle. Vehicles may include airbags supported on a dash, side air curtains mounted to roof rails, seat-mounted airbag, etc.

DETAILED DESCRIPTION

An airbag system includes a panel defining a chamber. A vent opening extends through the panel. A cover is positioned over the vent opening and attached to the panel. A conductor at least partially surrounds the vent opening and is operative to release at least a portion of the cover from the panel when the conductor is electrically energized.

The conductor burns and/or melts the cover to release the cover from the panel. The cover can be sewn to the panel with the conductor. A periphery of the vent opening comprises heat resistant material. The cover can overlap a periphery of the vent opening. The airbag system can include multiple vent openings and corresponding covers and conductors. The multiple conductors can be connected together in series. The airbag system can include an inflator in fluid communication with the chamber.

The airbag system can include a computer including a processor and a memory storing instructions executable by the processor to determine a size of an occupant and based on the size of the occupant, selectively energize one or more of the multiple conductors to release the corresponding covers. The instructions can include instructions to sequentially energize the one or more of the multiple conductors. The multiple conductors can be individually connected for separate control by the computer. The airbag system can include multiple wires positioned in the chamber and connecting the conductor to an electrical power source.

The airbag system can include a computer having a processor and a memory storing instructions executable by the processor to activate the inflator in response to certain vehicle impacts and energize the conductor to release the cover from the panel after a specified delay period following activation of the inflator. The airbag system can include multiple vent openings and corresponding covers and conductors. The instructions can include instructions to determine a size of an occupant and based on the size of the occupant, selectively energize one or more of the multiple conductors to release the corresponding covers.

With reference to the Figures, wherein like numerals indicate like parts throughout the several views, an airbag 28 includes flexible panels 30 and 32 joined together to enclose a chamber 34. Vent openings 41-44 are formed through one of the flexible panels, e.g., rear panel 32, and covers 51-54 are positioned over the vent openings 41-44 and attached to the panel 32. Conductors 55-58 at least partially surround the vent openings 41-44 and are operative to release at least a portion of the covers from the panel 32 when the conductors 55-58 are electrically energized. As explained more fully below, when the conductors 55-58 are electrically energized, portions of the conductors heat up to melt and/or burn through a perimeter of the covers 51-54 to release the covers 51-54 from the vent openings 41-44.

Figure 1:
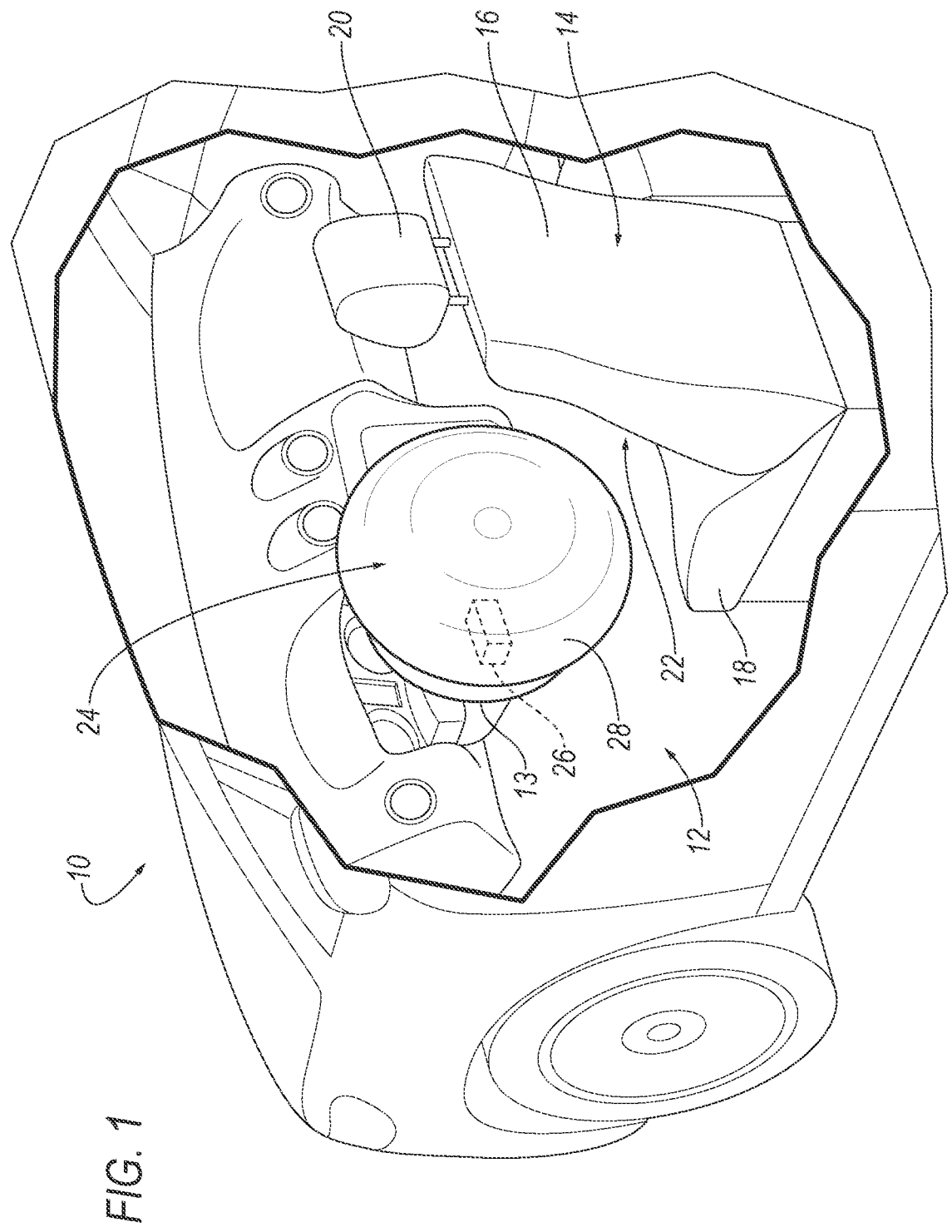
FIG. 1 is a perspective view of a vehicle having an airbag in an inflated position supported by a steering wheel of the vehicle.

With reference to FIG. 1, the vehicle 10 may be any suitable type of ground vehicle, e.g., a passenger or commercial automobile such as a sedan, a coupe, a truck, a sport utility, a crossover, a van, a minivan, a taxi, a bus, etc. The vehicle 10 includes a passenger compartment 12 to house occupants, if any, of the vehicle 10. The passenger compartment 12 may extend across the vehicle 10, i.e., from one side to the other side of the vehicle 10. The passenger compartment 12 includes a front end and a rear end with the front end being in front of the rear end during forward movement of the vehicle 10.

The vehicle 10 can include one or more seats 14. Specifically, the vehicle 10 may include any suitable number of seats 14. The seats 14 are supported by a vehicle 10 floor (not numbered). The seats 14 may be arranged in any suitable arrangement in the passenger compartment. As in the example shown in the Figures, one or more of the seats 14 may be at the front end of the passenger compartment that are spaced cross-vehicle from each other, e.g., a driver seat and/or a passenger seat (not visible). In other examples, one or more of the seats 14 may be behind the front end of the passenger compartment, e.g., at the rear end of the passenger compartment. The seats 14 may be movable relative to the vehicle 10 floor to various positions, e.g., movable fore-and-aft. The seat 14 may be of any suitable type, e.g., a bucket seat.

The seats 14 include a seatback 16, a seat bottom 18, and a head restraint 20. The head restraint 20 may be supported by and extending upwardly from the seatback 16. The head restraint 20 may be stationary or movable relative to the seatback 16. The seatback 16 may be supported by the seat bottom 18 and may be stationary or movable relative to the seat bottom 18. The seatback 16, the seat bottom 18, and the head restraint 20 may be adjustable in multiple degrees of freedom. Specifically, the seatback 16, the seat bottom 18, and the head restraint 20 may themselves be adjustable. In other words, adjustable components within the seatback 16, the seat bottom 18, and the head restraint 20 may be adjustable relative to each other.

The seatback 16 includes a seat frame (not shown) and a covering (not numbered) supported on the seat frame. The seat frame may include tubes, beams, etc. Specifically, the seat frame includes a pair of upright frame members. The upright frame members are elongated, and specifically, are elongated in a generally upright direction when the seatback 16 is in a generally upright position. The upright frame members are spaced from each other, and the seat frame includes one or more cross-members extending between the upright frame members. The seat frame, including the upright frame members, may be of any suitable plastic material, e.g., carbon fiber reinforced plastic (CFRP), glass fiber-reinforced semi-finished thermoplastic composite (organosheet), etc. As another example, some or all components of the seat frame may be formed of a suitable metal, e.g., steel, aluminum, etc.

The covering may include upholstery, padding, and/or plastic portions. The upholstery may be cloth, leather, faux leather, or any other suitable material. The upholstery may be stitched in panels around the seat frame. The padding may be between the covering and the seat frame and may be foam or any other suitable material.

The seatback 16 and the seat bottom 18 of each of the seats 14 define an occupant seating area 22 of the seats 14. The occupant seating area 22 is the area occupied by an occupant when properly seated on the seat bottom 18 and the seatback 16. The occupant seating area 22 is in a seat-forward direction of the seatback 16 and above the seat bottom 18. In the example shown in the Figures, the occupant seating area 22 faces the front end of the passenger compartment when the seat 14 is in the forward-facing position.

The disclosed airbag system can include an airbag assembly 24. The airbag assembly 24 can include an airbag 28, an inflator 26, and may include a housing (not visible). The airbag assembly 24, e.g., the airbag 28, can be supported by a steering wheel 13 of vehicle 10. In other examples, the airbag can be any type of airbag including, seat-mounted, curtain airbags, or any other airbags.

Figure 2:
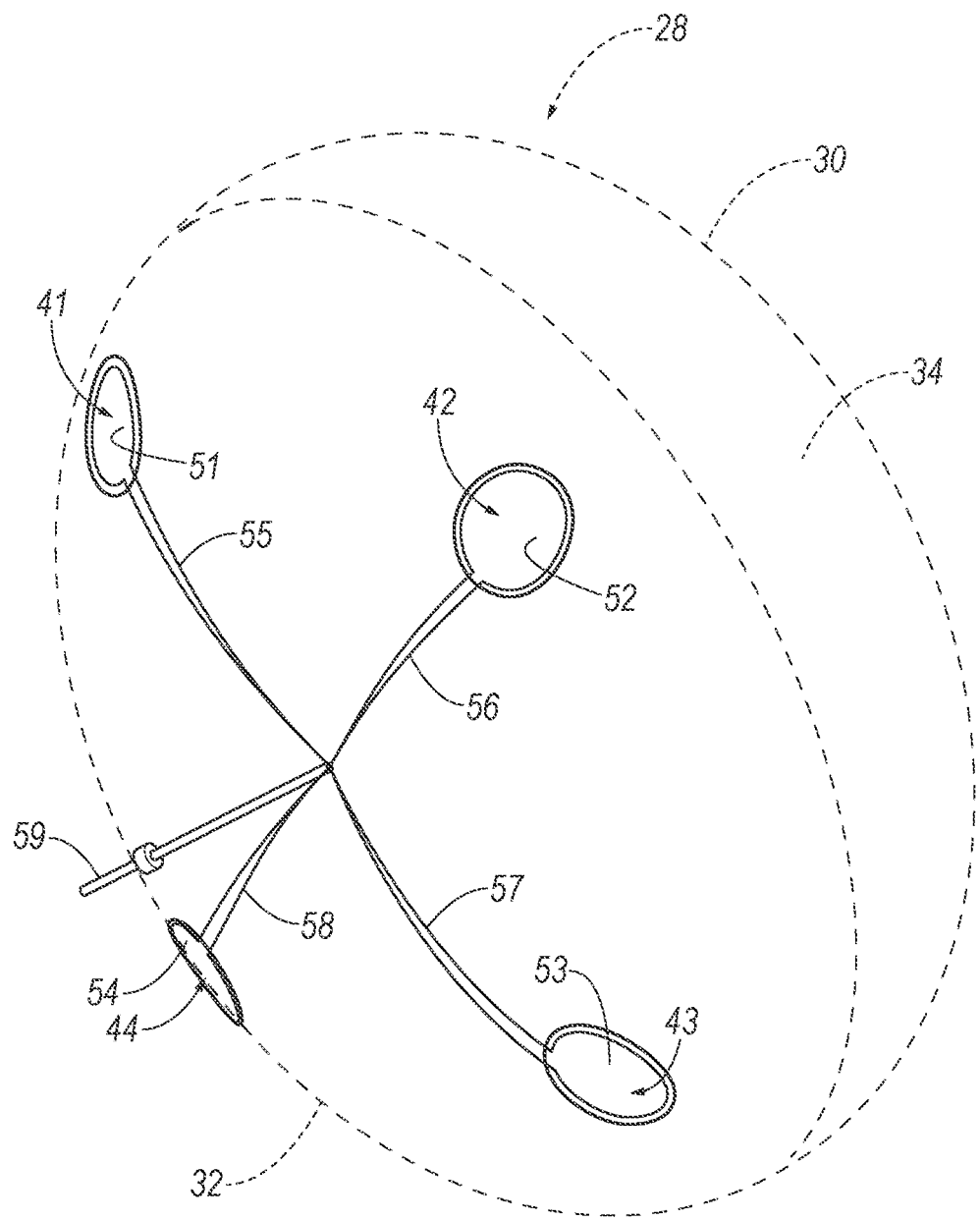
FIG. 2 is a perspective view of the airbag as viewed from the back side.

With reference to FIG. 2, the airbag 28 can include flexible panels 30 and 32 joined together to enclose a chamber 34, also referred to herein as an interior region. At least one vent opening is formed through at least one of the flexible panels 30 and 32. For example, four vent openings 41-44 are formed through panel 32. Each vent opening 41-44 has a corresponding cover 51-54 positioned over the opening and attached to the panel 32. Electrical conductors, such as wires 55-58, at least partially surround each vent opening 41-44 and are operative to release the covers from the panel 32 when the wires 55-58 are electrically energized, i.e., connected to an electrical power source. The electrical power source can be a battery of the vehicle 10 and/or from an alternator or generator on the vehicle 10, for example. Although the airbag 28 is shown and described with respect to four circular vent openings 41-44, more or fewer vent openings can be used. Furthermore, different shapes and sizes of vent openings can be used.

The airbag 28 may be fabric, e.g., a woven polymer. As an example, the airbag 28 may be woven nylon yarn, for example, nylon 6, 6. Other examples of woven polymers include polyether ether ketone PEEK, polyetherketoneketone PEKK, polyester, etc. The woven polymer may include a coating, such as silicone, neoprene, urethane, etc. For example, the coating may be polyorgano siloxane.

The wires 55-58 can be contained in the interior region of the airbag 28. The wires 55-58 can be glued, sewn, or otherwise attached to an interior surface of panel 32, for example. The wires can be attached to the interior surface of panel 32 prior to joining panels 30 and 32 together. The wires 55-58 can be connected in various configurations. In an example, all four wires 55-58 can be connected in series such that the covers 51-54 are released at the same time. In another example, the wires 55-58 can be connected together in groups. For example, wires 55 and 56 can be connected in series and wires 57 and 58 can be connected together in series. The wires 55-58 can also be separately connected to, e.g., computer 60, for individual control, as explained below. Wires 55-58 can be bundled into, e.g., a cable 59.

Figure 3:
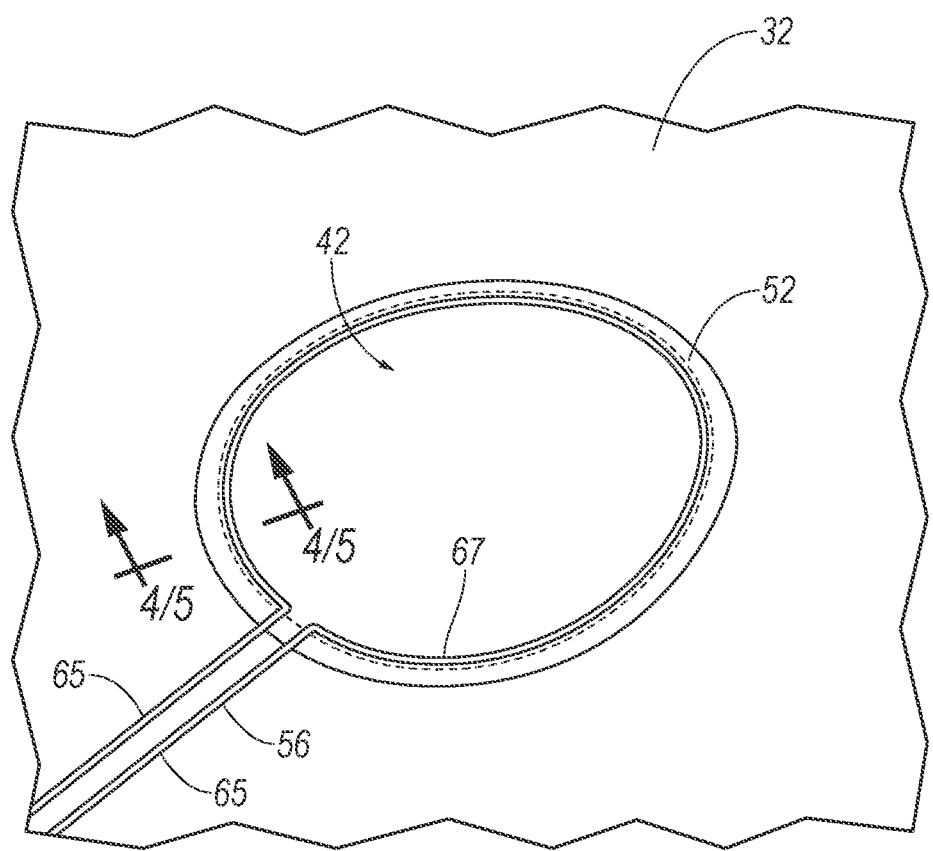
FIG. 3 is an enlarged partial perspective view showing an electronically releasable airbag vent.

With reference to FIG. 3, the electrical conductors, such as wire 56 can each include a pair of leads 65 that supply electrical energy to a perimeter portion 67. The perimeter portion 67 is positioned on the cover 52 and extends around a perimeter of vent opening 42. The leads 65 can be a larger diameter wire than the perimeter portion 67. Thus, the leads 65 can have a lower resistance than the perimeter portion 67. When computer 60 causes the electrical power source, e.g., a vehicle battery, to energize the perimeter portion 67, the higher resistance causes the perimeter portion 67 to resistively-heat to melt and/or burn the perimeter of the cover 52 releasing the cover 52 from the vent opening 42. The lower resistance and larger diameter wire prevents the leads 65 from heating up and affecting the panel 32. The lead wires 65 can also include insulation, such as plastic insulation. In an example, the current supplied to the perimeter portion 67 can be specified such that the cover is released in approximately 2-4 msec. The specified current, wire diameters, and materials for the leads 65 and perimeter portion 67 can be determined empirically by testing different diameters, materials, and current levels.

Figure 4:
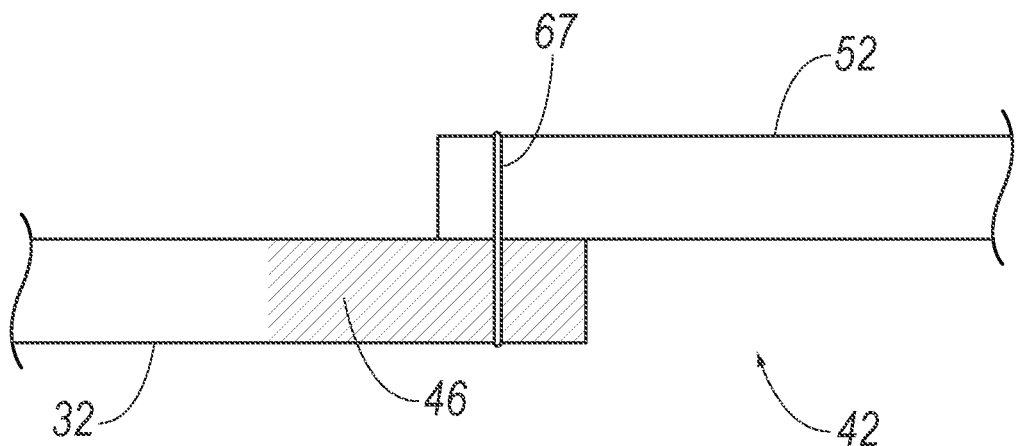
FIG. 4 is a partial cross-sectional view of an example of an electronically releasable airbag vent.

With reference to FIG. 4, the cover 52 can be sewn to the airbag panel 32 using the perimeter portion 67 of conductor 56. In other words, the perimeter portion 67 extends back and forth through the cover 52 and the panel 32 to fasten the cover to the panel. In this example, the diameter and material of the perimeter portion 67 are selected to cause the perimeter portion 67 to melt and/or burn away from the cover allowing the cover 52 to release from the panel 32 uncovering the vent opening 42.

Figure 5:
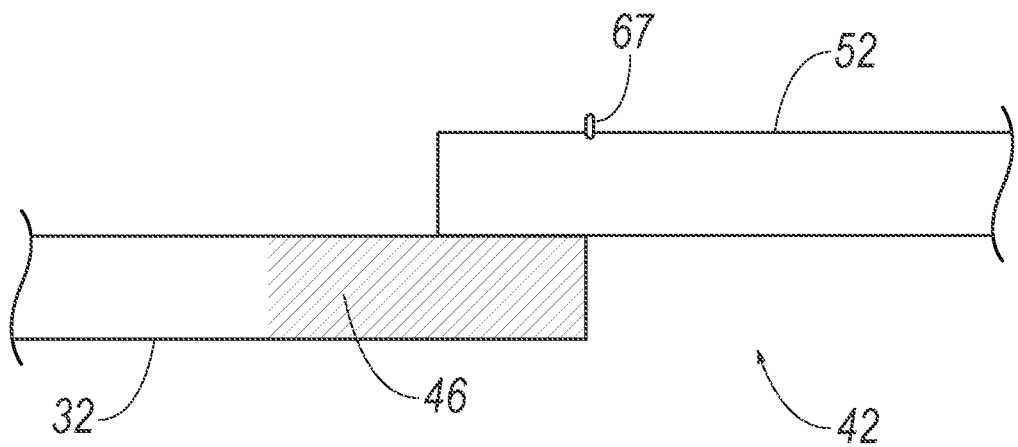
FIG. 5 is a partial cross-sectional view of another example of an electronically releasable airbag vent.

With reference to FIG. 5, in another example, the cover 52 can be e.g., glued and/or sewn to the panel 32 and the perimeter portion 67 is attached to the surface of the cover with e.g., glue. The cover 52 overlaps a periphery of the vent opening 42. In this example, the diameter and material of the perimeter portion 67 are selected to cause the perimeter portion 67 to melt and/or burn through the cover 52 allowing the cover 52 to release from the panel 32 uncovering the vent opening 42. In other words, the perimeter portion 67 melts and/or burns a hole through the cover 52.

With reference to FIGS. 4 and 5, a peripheral edge margin 46 of the vent opening 42 can be impregnated with flame retarding agent to isolate the melting/burning from the rest of the airbag 28. In an example, the periphery of the vent opening 42 can be a heat resistant material. In other examples, the flame retarding agent can be impregnated in the fabric panel 32 and/or the fabric panel 32 can include a flame retarding coating. In another example, the flame retarding agent can be impregnated in the individual yarn, a coating can be on the individual yarn, and/or yarns of different material than the rest of the panel can be used. In another example, the flame retarding agent need only be between the wires 55-58 and the panel 32. In some examples, suitable fire-resistant coatings can include intumescent paints and cementitious coatings.

Vents are used in airbag design to control bag pressure and stiffness at the required moment and location for effective control of occupant kinematics during certain vehicle impacts. Vent covers 51-54 can be selectively released to open vent openings 41-44 based on occupant size e.g., weight. The covers 51-54 may release to allow inflation medium to flow out of chamber 34 to adjust bag pressure and stiffness to help control the kinematics of occupants seated in the seats 14 in the event of certain impacts to the vehicle 10.

The inflator 26 is in fluid communication with the airbag 28. Specifically, the inflator 26 is in fluid communication with the chamber 34. The inflator 26 expands the airbag 28 with inflation medium, such as a gas, to move the airbag 28 from the uninflated position to the inflated position. The inflator 26 may be supported by any suitable component. For example, the inflator 26 may be supported by the housing of the airbag assembly 24. The inflator 26 may be, for example, a pyrotechnic inflator that ignites a chemical reaction to generate the inflation medium, a stored gas inflator that releases e.g., by a pyrotechnic valve stored gas as the inflation medium, or a hybrid. The inflator 26 may be, for example, at least partially in the inflation chamber of the airbag 28 to deliver inflation medium directly to the inflation chamber or may be connected to the inflation chamber through fill tubes, diffusers, etc.

Figure 6:
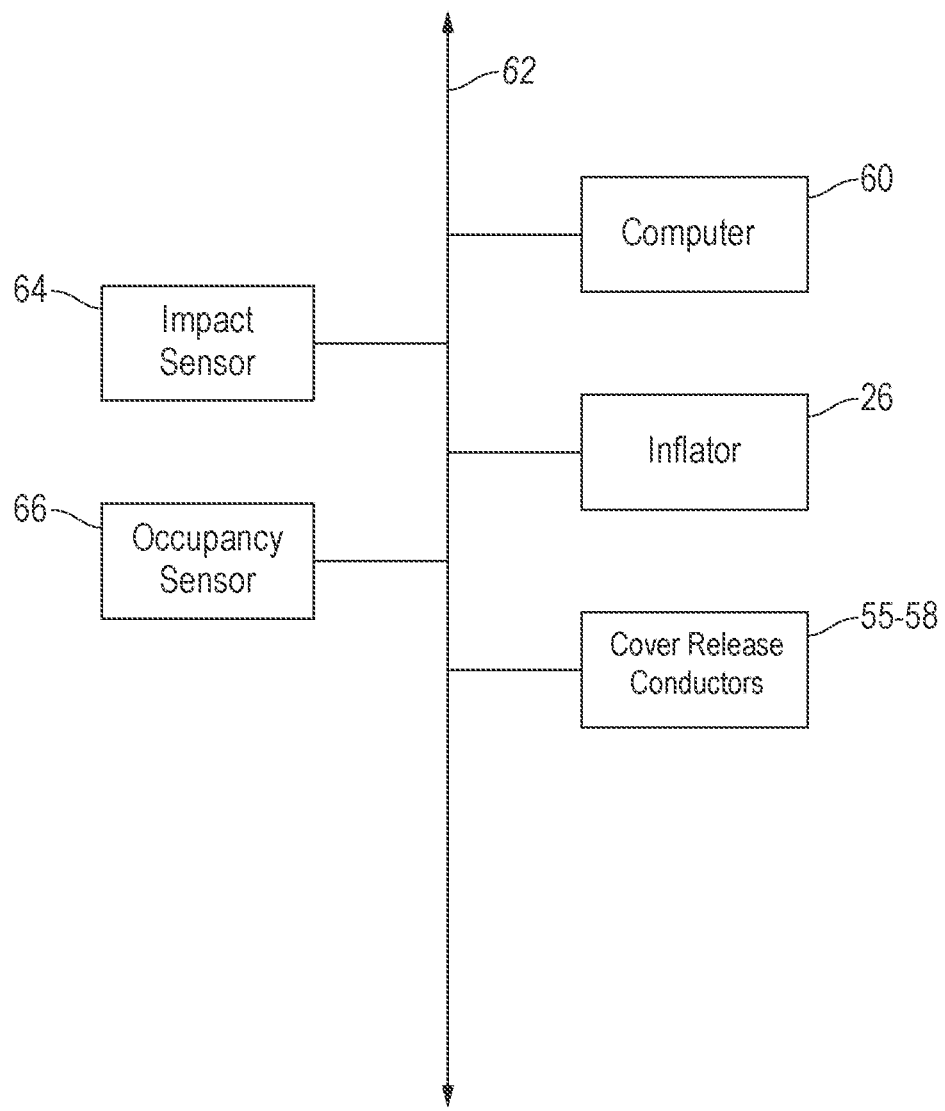
FIG. 6 is a block diagram of a system of the vehicle.

With reference to FIG. 6, an airbag system can include the airbag assembly 24, as well as a computer 60, a network 62, and various sensors, including an occupancy sensor 66 and an impact sensor 64. The computer 60 includes a processor and a memory. The memory includes one or more forms of computer readable media, and stores instructions executable by the computer 60 for performing various operations, including as disclosed herein. For example, the computer 60 may be a restraints control module (RCM). The computer 60 can be a generic computer with a processor and memory as described herein and/or may include an electronic control unit ECU or controller for a specific function or set of functions, and/or a dedicated electronic circuit including an ASIC (application specific integrated circuit) that is manufactured for a particular operation, e.g., an ASIC for processing sensor data and/or communicating the sensor data. In another example, the computer 60 may include an FPGA (Field-Programmable Gate Array) which is an integrated circuit manufactured to be configurable by a user. Typically, a hardware description language such as VHDL (Very High-Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. In some examples, a combination of processor(s), ASIC(s), and/or FPGA circuits may be included in a computer 60.

The memory can be of any type, e.g., hard disk drives, solid state drives, servers, or any volatile or non-volatile media. The memory can store the collected data sent from the sensors. The memory can be a separate device from the computer 60, and the computer 60 can retrieve information stored by the memory via a network in the vehicle 10, e.g., over a CAN bus, a wireless network, etc. Alternatively or additionally, the memory can be part of the computer 60, e.g., as a memory of the computer 60.

With continued reference to FIG. 6, the computer 60 is generally arranged for communications on a vehicle communication network 62 that can include a bus in the vehicle 10 such as a controller area network CAN or the like, and/or other wired and/or wireless mechanisms. Alternatively or additionally, in cases where the computer 60 actually comprises a plurality of devices, the vehicle communication network 62 may be used for communications between devices represented as the computer 60 in this disclosure. Further, as mentioned below, various controllers and/or sensors may provide data to the computer 60 via the vehicle communication network 62.

The vehicle 10 may include at least one impact sensor 64 for sensing certain vehicle impacts (e.g., impacts of a certain magnitude, direction, etc.). The vehicle computer 60 may activate the inflator 26, e.g., provide an impulse to a pyrotechnic charge of the inflator 26, when the impact sensor 64 senses certain vehicle impacts. Alternatively or additionally to sensing certain vehicle impacts, the impact sensor 64 may be configured to sense certain vehicle impacts prior to impact, i.e., pre-impact sensing. The impact sensor 64 is configured to detect certain vehicle impacts. In other words, a "certain vehicle impact" is an impact of the type and/or magnitude for which activation of the airbag assembly 24 is designed i.e., "certain" indicates the type and/or magnitude of the impact. The type and/or magnitude of such "certain vehicle impacts" may be pre-stored in the computer 60, e.g., a restraints control module and/or a body control module. The impact sensor 64 may be of any suitable type, for example, post contact sensors such as accelerometers, pressure sensors, and contact switches; and pre-impact sensors such as radar, LIDAR, and vision sensing systems. The vision sensing systems may include one or more cameras, CCD image sensors, CMOS image sensors, etc. The impact sensor 64 may be located at numerous points in or on the vehicle 10.

The vehicle 10 may include occupancy sensors 66 to identify whether an occupant is seated in one or more of the seats 14. The computer 60 may be in communication with the occupancy sensors 66. The occupancy sensors 66 may be coupled to the seats 14 to identify when an occupant is seated in the seats 14. As an example, the occupancy sensors 66 may indicate to the computer 60 that the seat 14 is occupied. For example, the occupancy sensor 66 may communicate to the computer 60, e.g., by sending a signal to the computer 60, that the seat 14 is occupied and in the absence of such communication the computer 60 may classify the seat 14 as unoccupied. As another example, the occupancy sensor 66 may be configured to communicate to the computer 60 that the seat 14 is occupied when the seat 14 is occupied and to communicate to the computer 60 that the seat 14 is unoccupied when the seat 14 is unoccupied, e.g., by sending a signal to the computer 60 when the seat 14 is occupied and unoccupied indicating occupancy or lack thereof.

The occupancy sensor 66 may determine the size of the occupant seated in the seat 14 when the seat 14 is determined to be occupied. Based on the determined size of the occupant the computer 60 can selectively release one or more of the vent opening covers 51-54 by energizing the corresponding conductors 55-58. The occupancy sensor 66 may determine, for example, the height and/or weight of the occupant in the seat 14. As an example, the occupancy sensors 66 may determine a larger occupant is seated in the seat 14. As another example, the occupancy sensors 66 may determine a smaller occupant is seated in the seat 14. The size of the occupant may be based on a standards-setting body, e.g., a government agency such as the National Highway Traffic Safety Administration (NHTSA). As one example, NHTSA has defined the 5th percentile female stature to be 5 feet tall and 110 pounds, e.g., the Hybrid III 5th percentile female. As another example, NHTSA has defined the 95th percentile male stature to be 6 feet 2 inches tall and 223 pounds, e.g., the Hybrid III 95th percentile male.

The occupancy sensor 66 may be, for example, a weight sensor, image detection, a buckled seatbelt, etc. The vehicle 10 may include any suitable number of occupancy sensors 66. For example, the vehicle 10 may include a number of occupancy sensors 66 equal to the number of seats 14 in the vehicle 10. Specifically, in some examples, the occupancy sensor 66 may be of a conventional type currently known in the art. The occupancy sensor 66 detects at least one size measurement of the occupant, e.g., weight, width, height, etc. As an example, the occupancy sensor 66 may be a weight sensor in the seat 14 for detecting the weight of the occupant. In such an example, the occupancy sensor 66 may include a sealed bladder and a pressure sensor in communication with the sealed bladder for detecting pressure changes in the bladder when an occupant sits on the seat 14. As another example, the occupancy sensor 66 may be a camera in the passenger cabin for detecting the size and/or shape of the occupant. In such an example, the camera can detect electromagnetic radiation in some range of wavelengths. For example, the camera may detect visible light, infrared radiation, ultraviolet light, or some range of wavelengths including visible, infrared, and/or ultraviolet light. The camera may be positioned such that a field of view of the camera encompasses the seat. Based on the detection by the occupancy sensor 66, an occupant-classification system (OCS) determines the size of an occupant seated in the seat 14. The size of the occupant may be classified based on anthropomorphic size identified in regional regulations. As examples, the OCS may classify the occupant as being within a size range associated with an adult occupant.

Figure 7:
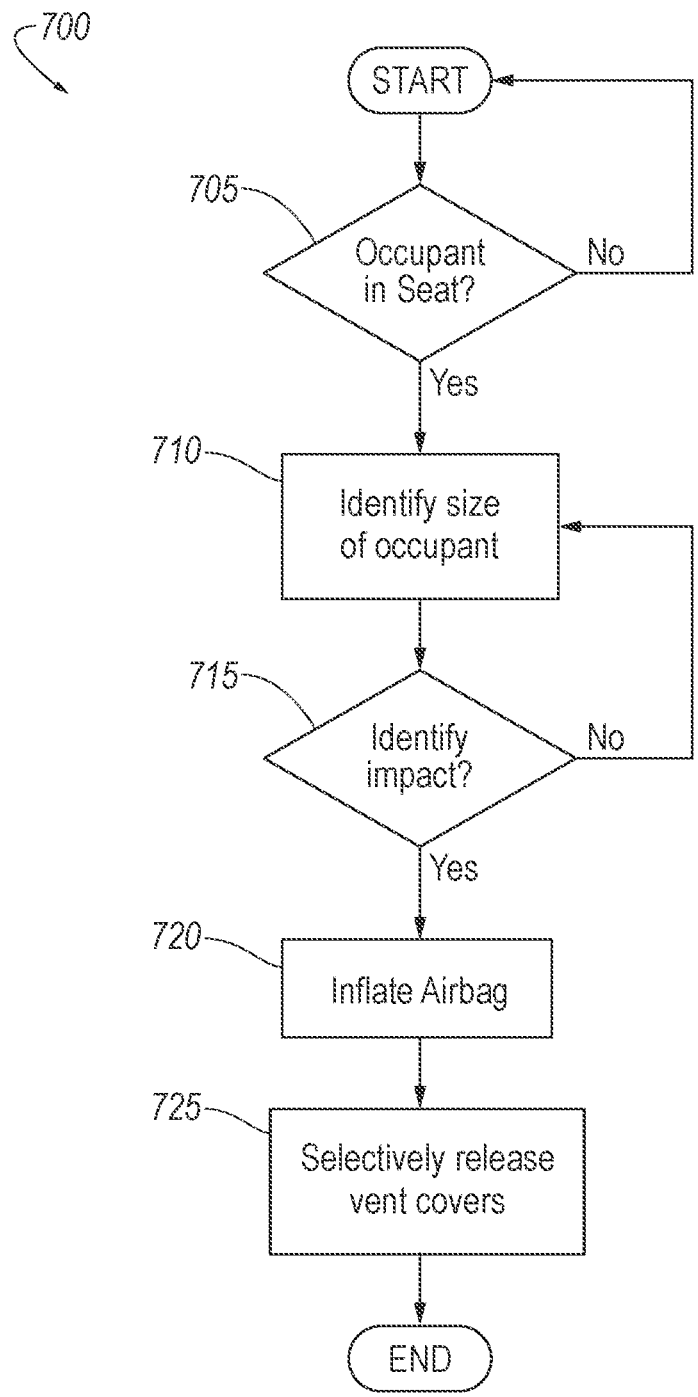
FIG. 7 is a flowchart of a method executable by a vehicle computer.

With reference to FIG. 7, the vehicle computer 60 stores instructions to control components of the vehicle 10 according to the method 700. Specifically, as shown in FIG. 7, the method 700 includes selectively releasing vent opening covers based on a determination of the size of the occupant of the seat 14. Use of "in response to," "based on," and "upon determining" herein indicates a causal relationship, not merely a temporal relationship.

With reference to decision block 705, the method 700 includes identifying an occupant is seated in the seat 14. The occupancy sensor 66 may notify the computer 60 that an occupant is seated in the seat 14, such as by sending a signal or lacking sending a signal. If no occupant is determined to be seated in the seat 14, the method 700 returns to its start. If an occupant is determined to be seated in the seat 14, the method 700 moves to block 710.

With reference to block 710, based on determining the seat 14 is occupied, the method 700 includes determining the size, e.g., weight, of the occupant of the seat 14. The occupancy sensors 66 may send a signal notifying the computer 60 of the size of the occupant in the seat 14. The size of the occupant may be stored by the computer 60 to be used to determine which of the vent opening covers 51-54 to selectively release.

With reference to decision block 715, the method 700 includes identification of a certain vehicle impact. The impact sensors 64 may identify whether a certain vehicle impact has occurred. If a certain vehicle impact is identified, the method 700 moves to block 720. If no certain vehicle impact is identified, the method 700 returns to block 710.

With reference to block 720, based at least on identification of the certain vehicle impact, the method 700 includes inflating the airbag 28 to the inflated position. The computer 60 may send a signal to the inflator 26 to move the airbag 28 to the inflated position.

With reference to block 725, based on the identification of the size of the occupant that was stored by the computer 60 and the identification of the certain vehicle impact, the method 700 includes selectively releasing one or more of the vent opening covers 51-54 by energizing the corresponding conductors 55-58. For example, if the size of the occupant is small, e.g., $5^{th}$ percentile female, more vents are opened in order to reduce the stiffness of the airbag 28. If the occupant is larger, e.g., 95th percentile male, fewer vents are opened in order to increase the stiffness of the airbag. In some examples, vents can be opened sequentially. In another example, the vents can be opened following a specified delay period after the airbag is inflated at block 720. For example, the vents can be released approximately 25 msec after a signal to inflate a frontal airbag and approximately 9 msec after a signal to inflate a side airbag.

The disclosure has been described in an illustrative manner, and it is to be understood that the terminology which has been used is intended to be in the nature of words of description rather than of limitation. The numerical adjectives first, second, etc., are used throughout this document as identifiers and do not signify importance, order, or quantity. Many modifications and variations of the present disclosure are possible in light of the above teachings, and the disclosure may be practiced otherwise than as specifically described.

What is claimed is:

1. An airbag system, comprising:
   a panel defining a chamber;
   a vent opening extending through the panel, the panel including a peripheral edge margin surrounding the vent opening, the peripheral edge margin being of a one-piece construction with a portion of the panel adjacent the peripheral edge margin;
   a cover positioned over the vent opening, the cover overlapping the peripheral edge margin; and
   a conductor at least partially surrounding the at least one vent opening and operative to burn and/or melt the cover to release at least a portion of the cover from the panel when the conductor is electrically energized;
   the peripheral edge margin including a heat-resistant material different than the material of the portion of the panel adjacent the peripheral edge margin to isolate the conductor from the portion of the panel adjacent the peripheral edge margin.

2. The system of claim 1, wherein the cover is sewn to the peripheral edge margin by the conductor.

3. The system of claim 1, further comprising multiple vent openings and corresponding covers and conductors.

4. The system of claim 3, wherein the multiple conductors are connected together in series.

5. The system of claim 3, further comprising a computer including a processor and a memory storing instructions executable by the processor to:
   determine a size of an occupant; and
   based on the size of the occupant, selectively energize one or more of the multiple conductors to release the corresponding covers.

6. The system of claim 5, wherein the instructions include instructions to sequentially energize the one or more of the multiple conductors.

7. The system of claim 5, wherein the multiple conductors are individually connected for separate control by the computer.

8. The system of claim 1, further comprising multiple wires positioned in the chamber and connecting the conductor to an electrical power source.

9. The system of claim 1, further comprising an inflator in fluid communication with the chamber.

10. The system of claim 9, further comprising a computer including a processor and a memory storing instructions executable by the processor to:
    activate the inflator in response to certain vehicle impacts; and energize the conductor to release the cover from the panel after a specified delay period following activation of the inflator.

11. The system of claim 10, further comprising multiple vent openings and corresponding covers and conductors.

12. The system of claim 11, wherein the instructions include instructions to determine a size of an occupant and based on the size of the occupant, selectively energize one or more of the multiple conductors to release the corresponding covers.

13. The system of claim 1, wherein the heat resistant material is impregnated and/or coated on fabric of the peripheral edge margin.

14. The system of claim 1, wherein the heat resistant material is a yarn of a different material than yarn of the portion of the panel adjacent the peripheral edge margin.

* * * * *